(No Model.)

W. L. EDSON.
CREAM TESTER.

No. 304,263. Patented Aug. 26, 1884.

Attest:
W. H. H. Knight
H. Bernhard

Inventor:
Wyman L. Edson
per Edson Bros.
Attorneys

UNITED STATES PATENT OFFICE.

WYMAN L. EDSON, OF UNION CENTRE, NEW YORK.

CREAM-TESTER.

SPECIFICATION forming part of Letters Patent No. 304,263, dated August 26, 1884.

Application filed March 12, 1884. (No model.)

*To all whom it may concern:*

Be it known that I, WYMAN L. EDSON, a citizen of the United States, residing at Union Centre, in the county of Broome and State of New York, have invented certain new and useful Improvements in Cream-Testers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to cream-testers, and has for its object the provision of means whereby the amount of cream contained in a given amount of milk of one or more animals may be accurately measured and compared with the amount of cream contained in the milk of one or more or any other number of animals.

To this end the invention consists in a suitable frame provided with a series of graduated scales, and a series of tubes adapted to be placed in close proximity to such scales, substantially as hereinafter described, and particularly pointed out in the claim.

Figure 1:
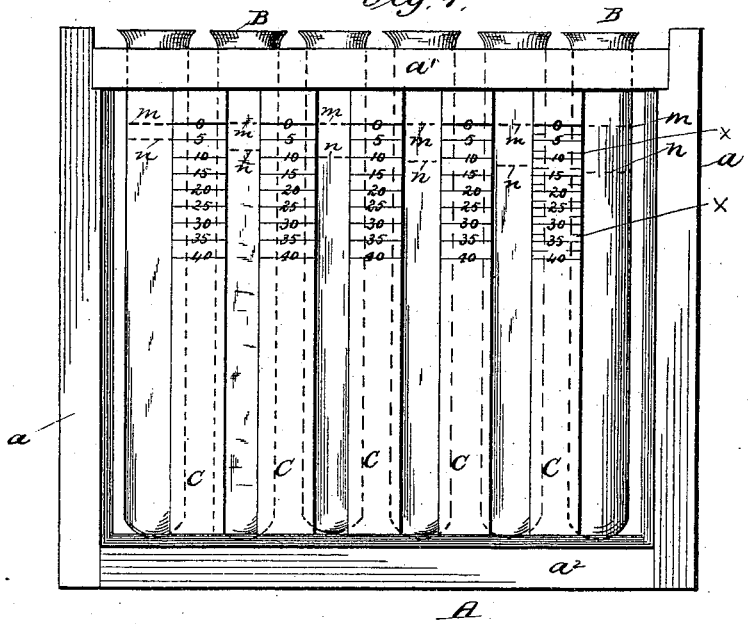
Figure 2:
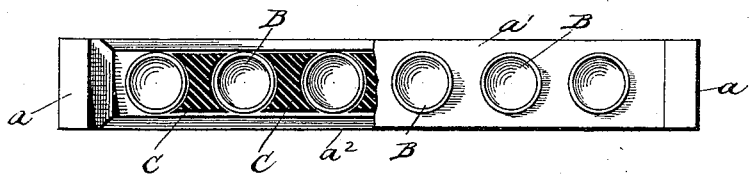

In the drawings, Figure 1 represents a cream-tester embodying my invention. Fig. 2 is a top plan view thereof, partly in section, to show details of construction.

Similar letters of reference in the several drawings denote like parts.

Referring to the drawings, A designates a frame, (shown herein as formed of wood,) having side pieces, $a\ a$, top rail, $a'$, bottom rail, $a^2$. If desired, however, the frame may be formed of metal or other suitable material, with or without a back.

B designates test-tubes, preferably formed of glass and of equal size and form. The tubes pass downward through apertures formed in the top rail, $a'$, and rest upon the lower rail, $a^2$.

C C designate bars extending from the top to the bottom rails, $a'\ a^2$, as shown. The bars C are each placed at the side of, in close proximity to, and preferably partially surrounding, two of the tubes B, as shown in Fig. 2. The outer surfaces of the bars C are in line with the outer surfaces of the tubes B, (see Fig. 2,) and are provided with graduated scales, as shown. Said scales may consist of any desired number of divisions. Said scales may be printed, painted, or engraved upon the bars, or printed or painted upon paper, cloth, or other material, and afterward secured upon said bars. If desired, the main divisions of the scale may be subdivided, as shown at $x$.

The tubes B are shown herein circular in cross-section; but, as will be readily understood, they may be made in any form. The frame may have any form desired, it not being necessary that the exact form shown herein be followed. The tubes are filled with milk (fresh from the animals) to the line marked by a cipher, as shown by dotted lines marked $m$. As the separation of the cream from the milk takes place, the line of division will be plainly indicated, as shown by dotted lines marked $n$. If a series of tubes are filled with milk from separate animals, and no two tubes contain milk from the same animal, it will be seen that the proportion of cream contained in the milk of each animal can be easily compared with that of other animals in the other tubes.

It will be understood that, if desired, the milk of an entire dairy can be tested in a single tube with milk of other dairies or the milk of a single cow.

I am aware that a frame for holding a series of graduated glass tubes is not new, and I lay no claim, broadly, for such a device.

What I claim as my invention, and desire to secure by Letters Patent of the United States, is—

A cream-tester substantially such as herein described, consisting of a frame having one or more scale-bars placed apart between the end pieces of the frame, a series of test-tubes placed within the frame, each scale-bar partially inclosing the tubes and serving to protect them from breakage, as set forth.

In testimony whereof I affix my signature in presence of two witnesses.

WYMAN L. EDSON.

Witnesses:
H. C. CHENEY,
MARSHAL MOORE.